May 5, 1959
A. B. DE LA BRETONIERE
2,885,615
ELECTRIC MOTOR DRIVE SYSTEM
Filed May 18, 1956
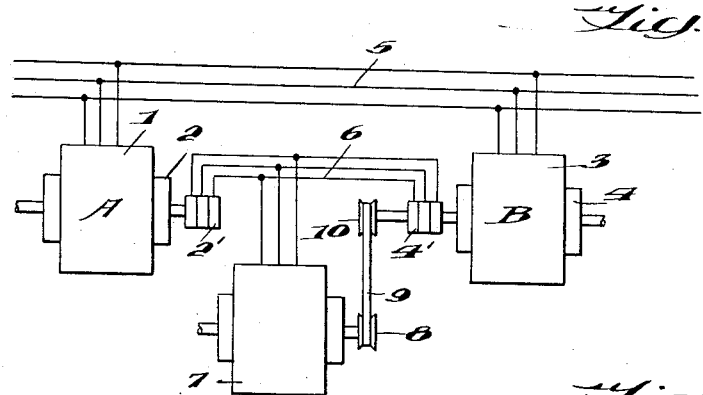
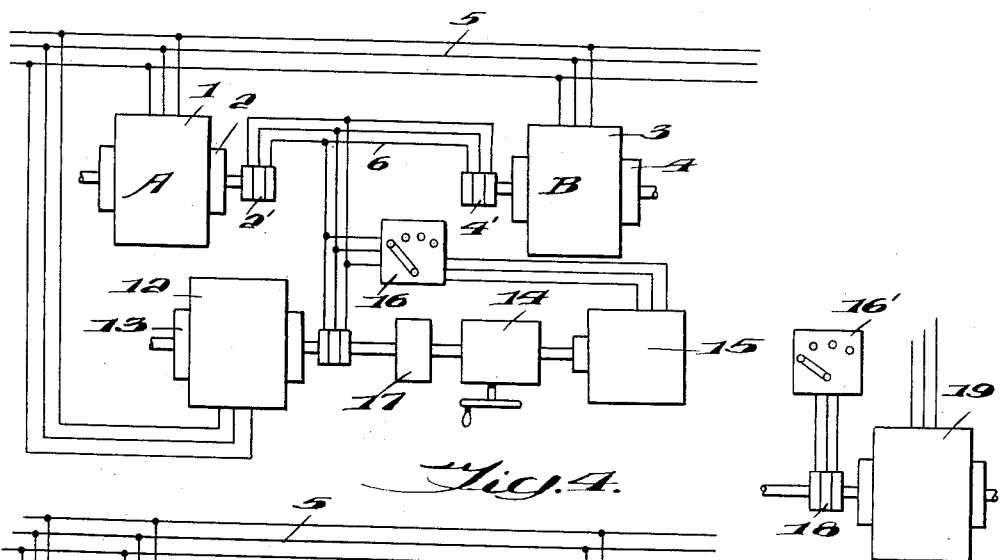
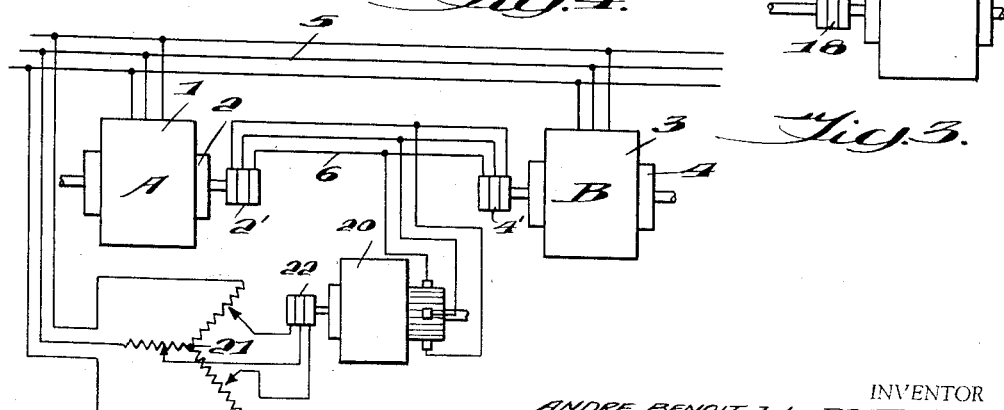
INVENTOR
ANDRE BENOIT de la BRETONIERE,
BY Met R. Poston
ATTORNEY 000
United States Patent Office 2,885,615
Patented May 5, 1959

2,885,615
ELECTRIC MOTOR DRIVE SYSTEM

André Benoit De La Bretoniere, Arnhem, Netherlands, assignor to American Enka Corporation, Enka, N.C., a corporation of Delaware Application May 18, 1956, Serial No. 585,715

Claims priority, application Netherlands May 28, 1955

2 Claims. (Cl. 318—44)

This invention relates to a speed control for an electric motor drive system comprising at least two asynchronous, three-phase induction motors with slip-ring rotors electrically connected together and being fed from a three-phase source. The stators are connected directly to the three-phase source and the rotors connected to a means for regulating the motor speed.

This invention has particular application to installations, apparatus or equipment having several electric motors which must be started simultaneously under load. An example of such an application would be a spinning or weaving mill, a rolling mill, a paper mill, or a conveyor system, where several motors of the system must start simultaneously when the installation or equipment is put into operation.

The conventional system of this kind has the disadvantage that hunting due to load variations when starting and during operation cannot be avoided so that the whole motor system may drop out of phase, and furthermore, the efficiency of such a system is not good.

The motor drive system according to this invention avoids these disadvantages in that the regulating means comprises an asynchronous, three-phase induction motor electrically connected to the slip frequency network formed by the electrical tie between the slip-rings of the motors and mechanically coupled to one of the motors of the system or to any shaft of the system, or to a separate frequency converter. As a result, any load variations which may occur are reflected in the system through the asynchronous, three-phase induction motor to the slip frequency network and distributed over the whole of the installation to be driven.

In order to keep the costs as low as possible, the driving system according to the invention may be so constructed that the asynchronous, three-phase induction motor is coupled through a mechanical variator or speed changer to one of the motors or to any shaft of the installation to be driven.

A smooth start or step-by-step speed may, according to the invention, also be obtained if the asynchronous, three-phase induction motor of the regulating means is a three-phase induction commutator motor. This latter arrangement has a further advantage in that it is less complicated than that of the driving system having a mechanical variator or speed changer.

A smooth start or step-by-step speed may, according to the invention, also be achieved if the asynchronous, three-phase induction motor of the regulating means is equipped with a resistance starter, or if the asynchronous, three-phase induction motor of the regulating means is connected through a mechanical friction clutch in the mechanical transmission of the asynchronous, three-phase induction motor and the installation to be driven. This may also be achieved by selecting as an asynchronous motor of the regulating means, an asynchronous induction motor with slip-ring rotor combined with a resistance starter.

The invention will be described below with reference to the accompanying drawings showing diagrammatically and by way of example four embodiments of the driving system according to the invention.

Fig. 1 shows a motor drive system in which the regulating means comprises an asynchronous, three-phase induction motor connected to the slip frequency network of the system;

Fig. 2 shows an embodiment in which the asynchronous induction motor is coupled through a mechanical variator or speed changer to a driving motor or to a separate frequency converter;

Fig. 3 shows a part of a variant of the embodiment shown in Fig. 2; and

Fig. 4 shows an embodiment in which a three-phase induction commutator motor is used in combination with a regulating transformer.

The driving system shown in Fig. 1 comprises two asynchronous, three-phase induction driving motors A and B having slip-ring rotors 2 and 4, respectively, connected together electrically, and having the stators 1 and 3, respectively, which are connected to the three-phase line 5. The slip-rings 2' and 4' of the asynchronous, three-phase induction motors A and B, respectively, are connected to one another by the slip-ring network 6. An asynchronous, three-phase induction motor 7 is connected to the slip frequency network 6, and the shaft of motor 7 is coupled through a mechanical coupling, as, for example, pulley 8, belt 9 and pulley 10, with the shaft of the driving motor B. It is obvious that motor 7 could also be coupled with any shaft of the installation to be driven by the motor drive system. The operation of this embodiment may be explained briefly as follows. Upon energization of three-phase line 5, rotor 2 and 4 begin to move and eventually achieve a position in which there is no phase angle difference between the rotor fields thereof. Consequently, the current flowing between these rotors tends to reach a minimum value throughout the network 6. After connecting the regulating motor belt transmission device 7, 8, 9 and 10 of Figure 1 electrically to this network 6, rotors 2 and 4 begin to rotate. The network 6 supplies current to the stator of regulating motor 7 at a frequency dependent on the relative speed between the rotors and the rotating fields of motors A and B. The frequency of the current in network 6 is inversely proportional to the speed of motors A and B, but the speed of regulating motor 7 is directly proportional to this frequency.

Therefore, if the load on motor A or B is suddenly increased, for example, the speed of that motor will be decreased slightly. This increases the frequency of the current in network 6 and consequently increases the speed of motor 7, which is mechanically connected to motor B. Regulating motor 7 therefore supplements or increases the rotation of motor B, which results in a decrease in the frequency of current in network 6 and thereby stabilizes the system. Inasmuch as these operating characteristics are known to this art, further discussion is deemed unnecessary.

In the embodiment shown in Fig. 2, the asynchronous, three-phase current motors A and B are connected, just as in the embodiment according to Fig. 1, to the three-phase line 5. The slip frequency network again has been indicated by reference numeral 6. Reference 12 indicates the stator of an asynchronous, three-phase induction motor connected to the three-phase line 5. The rotor 13 is connected to the slip frequency network 6. This three-phase induction motor 12—13 is coupled through a mechanical variator or speed changer 14 to a three-phase induction motor 15. This three-phase induction motor is provided with a starting resistance 16 adapted to be short-circuited. A friction clutch 17 may be connected between the motors 12—13 and 15 and the mechanical variator 14.

The embodiment of Figure 2 is started in a manner similar to that explained above, with the exception of the starting resistance 16, but operates slightly differently from the first modification. At the beginning of operation, starting resistance 16 is "all-in" but gradually is decreased as the rotor of motor 15 increases in speed, thus providing a smooth start. Eventually, this resistance is completely short-circuited and the stator of this motor becomes directly connected to the network 6. If the speed of either of the drive motors A or B decreases due to change in load, the frequency of the current supplied to network 6 will increase. This increases the speed of frequency converter drive motor 15 which is mechanically connected to and therefore drives regulating frequency converter 12, 13 at a faster rate of speed. Since the frequency converter is connected to network 6, this decreases the frequency of the current therein and consequently increases the speed of the overloaded motor without undesirable hunting.

The mechanical variator 14 may be utilized to control the speed of drive motors A and B. A small adjustment of the variator 14 may produce a large change in speed in view of the cumulative effect of the electrical cycle explained above. The maximum and minimum speeds of the variator 14 may be determined as follows, $$N_{max} = \frac{N_s}{1+\sqrt{\frac{1}{R}}} \text{ r.p.m.} \quad N_{min} = \frac{N_s}{1+\sqrt{R}} \text{ r.p.m.}$$

where $N_s$ is the synchronous speed of the driving motors and R is the range of the variator 14. For example, if motors A, B, and 15 are four-pole motors and the range is 6, the limiting machine speeds are found to be:

$$N_{max} = \frac{1800}{1+\sqrt{\frac{1}{6}}} = \text{approximately 1200 r.p.m.}$$

$$N_{min} = \frac{1800}{1+\sqrt{6}} = \text{approximately 520 r.p.m.}$$

If a speed below 520 r.p.m. is desired or necessary, the resistance 16 may be used.

Instead of the above-described embodiment with a mechanical variator according to Fig. 2, one may use in this embodiment an asynchronous motor 19 with slip-ring rotor 18 connected in the manner shown in Fig. 3, to a resistance stator 16'.

In this embodiment, motor 19 is utilized to drive regulating frequency converter 12, 13. This motor differs from the motor 15 of the second embodiment in that an external, variable resistance 16' is provided and, through slip rings 18, closes the rotor circuits. This variable resistance therefore replaces, or could be used in addition to, the mechanical variator 14. Changing the resistance of the rotor circuits changes the motor speed and accordingly varies the speed of the frequency converter 12, 13 and motors A, B. This system provides a smooth acceleration or jogging speed similar to that described above.

In the embodiment according to Fig. 4, a three-phase commutator motor 20 is connected with its commutator brushes to the slip frequency network 6, the slip-ring brushes 22 of said motor being connected through a regulating transformer 21 to the three-phase line 5 (Scherbius-system).

In the operation of this embodiment, the regulating transformer 21 is set at a desired position of speed control. The commutator motor 20 operates, therefore, at a predetermined and substantially constant speed to control the frequency of the current in network 6. Speed regulation is of course possible through shifting of the commutator brushes.

It is obvious that the invention is not restricted to the embodiments described above and shown in the drawings, but that these may be modified in various ways without departing from the scope of this invention.

I claim:

1. An electric motor drive system comprising a plurality of asynchronous, three-phase induction drive motors having wound, slip-ring type rotors, means connecting the stators of said drive motors to a three-phase line, means interconnecting the slip-rings of said drive motors to form a slip frequency network, a speed regulating system comprising an asynchronous, three-phase induction frequency converter having a wound, slip-ring type rotor, means connecting the stator of said frequency converter to said three-phase line, means connecting the slip-rings of said frequency converter to said slip frequency network, a frequency converter drive motor mechanically coupled to said frequency converter, means connecting the stator of said frequency converter drive motor to said slip frequency network and means for varying the relative speed between said frequency converter and said frequency converter drive motor.

2. An electric motor drive system comprising a plurality of asynchronous, three-phase induction drive motors having wound, slip-ring type rotors, means connecting the stators of said drive motors to a three-phase line, means interconnecting the slip-rings of said drive motors to form a slip frequency network, a speed regulating system comprising an asynchronous, three-phase induction frequency converter having a wound, slip-ring type rotor, means connecting the stator of said frequency converter to said three-phase line, means connecting the slip-rings of said frequency converter to said slip frequency network, a frequency converter drive motor having a wound, slip-ring type rotor mechanically coupled to said frequency converter, means connecting the stator of said frequency converter drive motor to said slip frequency network and a variable resistance connected to the slip-rings of said frequency converter drive motor for varying the speed thereof.

References Cited in the file of this patent

UNITED STATES PATENTS

| 1,285,698 | Hellmund | Nov. 26, 1918 |
| 1,757,734 | Perry | May 6, 1934 |
| 2,768,341 | Landis | Oct. 23, 1956 |

FOREIGN PATENTS

| 506,732 | France | June 4, 1920 |
| 939,807 | France | Apr. 26, 1948 |